United States Patent
Gaggar et al.

(10) Patent No.: US 7,915,328 B2
(45) Date of Patent: Mar. 29, 2011

(54) FLAME RETARDANT RESINOUS COMPOSITIONS AND PROCESS

(75) Inventors: Satish Gaggar, Parkersburg, WV (US); Cameron Youngstrom, Parkersburg, WV (US)

(73) Assignee: SABIC Innovative Plastics IP B.V. (NL)

( * ) Notice: Subject to any disclaimer, the term of this patent is extended or adjusted under 35 U.S.C. 154(b) by 54 days.

(21) Appl. No.: 12/346,065

(22) Filed: Dec. 30, 2008

(65) Prior Publication Data

US 2010/0168283 A1 Jul. 1, 2010

(51) Int. Cl.
*B29C 47/00* (2006.01)
*C08K 11/00* (2006.01)

(52) U.S. Cl. ............................................. 524/13; 524/9

(58) Field of Classification Search ...................... 524/13
See application file for complete search history.

(56) References Cited

U.S. PATENT DOCUMENTS

| | | | |
|---|---|---|---|
| 3,078,254 A | 2/1963 | Zelinski et al. | |
| 3,265,765 A | 8/1966 | Holden et al. | |
| 3,297,793 A | 1/1967 | Dollinger | |
| 3,402,159 A | 9/1968 | Hsieh | |
| 3,423,343 A | 1/1969 | Barnett | |
| 3,513,114 A | 5/1970 | Hahn et al. | |
| 3,594,452 A | 7/1971 | De La Mare et al. | |
| 3,976,608 A | 8/1976 | Buckler et al. | |
| 4,222,926 A | 9/1980 | Mizuno et al. | |
| 4,254,177 A | 3/1981 | Fulmer | |
| 4,256,786 A | 3/1981 | Dias et al. | |
| 4,400,475 A | 8/1983 | Kennedy | |
| 5,100,936 A | 3/1992 | Inverarity et al. | |
| 5,393,804 A | 2/1995 | George et al. | |
| 5,672,645 A | 9/1997 | Eckel et al. | |
| 5,965,665 A * | 10/1999 | Fukuyama et al. | 525/65 |
| 6,080,805 A | 6/2000 | Kaufman | |
| 6,384,128 B1 | 5/2002 | Wadahara et al. | |
| 6,451,882 B1 | 9/2002 | Hughes | |
| 6,831,119 B2 | 12/2004 | Brown et al. | |
| 7,255,814 B2 | 8/2007 | Hoerold et al. | |
| 7,259,200 B2 * | 8/2007 | Bauer et al. | 524/126 |
| 7,273,901 B2 | 9/2007 | Sicken et al. | |
| 2006/0148934 A1 | 7/2006 | Miyama et al. | |
| 2008/0073627 A1 | 3/2008 | Goode et al. | |
| 2009/0192245 A1 * | 7/2009 | Gaggar et al. | 524/35 |

FOREIGN PATENT DOCUMENTS

| | | |
|---|---|---|
| CA | 2217530 A1 | 4/1999 |
| CN | 1740234 A | 3/2006 |
| CN | 101-143-952 A | 3/2008 |
| CN | 101-153-098 A | 4/2008 |
| DE | 3920995 A1 | 1/1990 |
| GB | 1184878 A | 3/1970 |
| GB | 1264741 | 2/1972 |
| GB | 2300860 A | 9/1996 |
| GB | 2437778 A | 11/2007 |
| JP | 53031738 A | 3/1978 |
| JP | 2000007880 A2 | 1/2000 |
| JP | 2006002007 A2 | 1/2006 |
| JP | 2006088436 A2 | 4/2006 |
| JP | 2007039544 A | 2/2007 |
| WO | 2009/097628 A1 | 8/2009 |

OTHER PUBLICATIONS

U.S. Appl. No. 12/022,420, filed Jan. 30, 2008.
M. Le Bras et al., "Intumescent Polypropylene/Flax Blends: A Preliminary Study", in Polymer Degradation and Stability, vol. 88 (2005), pp. 80-84.
Sz. Matko et al., "Flame Retardancy of Biodegradable Polymers and Biocomposites" in Polymer Degradation and Stability, vol. 88 (2005), pp. 138-145.
G. Camino et al., "Performance and Mechanisms of Fire Retardants in Polymers: A Review", in Polymer Degradation and Stability, vol. 20, No. 3-4 (Jan. 1, 1988), pp. 285-292.
PCT International Search Report for International application PCT/US2009 / 068890.
Product data sheet for EXOLIT AP 423.
Schacker (website) http://www.mindfully.org/Plastic/Flame/Ammonium-Polyphosphate-FlameApr02.htm.

* cited by examiner

*Primary Examiner* — Ling-Siu Choi
*Assistant Examiner* — Hui Chin

(57) ABSTRACT

Disclosed is a resinous, flame-retardant composition comprising (i) 40-66 wt. % alkenyl aromatic resin, (ii) 9-33 wt. % ammonium polyphosphate, (iii) 14-40 wt. % cellulosic material and (iv) an amount of between 0.1 parts per 100 parts resinous components (phr) and 10 phr of at least one metal stearate, wherein all weights are based on the total weight of the composition and wherein ammonium polyphosphate and cellulosic material are present in a weight % ratio effective to provide molded articles exhibiting at least V-1 flame rating as determined according to the UL-94 protocol. Processes to prepare the composition and articles comprising a composition of the invention are also disclosed.

27 Claims, No Drawings

FLAME RETARDANT RESINOUS COMPOSITIONS AND PROCESS

BACKGROUND

The present invention relates to flame retardant resinous compositions comprising an alkenyl aromatic resin and a cellulosic material.

Flame retardant resinous compositions comprising an alkenyl aromatic resin, such as a styrenic resin, typically comprise a halogen-containing flame retardant additive. In order to minimize environmental, health and safety (EHS) issues, there is a great market need to develop flame retardant alkenyl aromatic resin compositions containing non-halogen flame retardant additives. Such compositions are known as eco-friendly flame retardant compositions. Typically, it has not been possible to develop flame retardant alkenyl aromatic resin compositions without halogen-containing additives with needed flammability rating while maintaining good mechanical properties and desirable processing characteristics. Hence, there is a need for eco-friendly flame retardant alkenyl aromatic resin compositions with suitable flame retardant properties which compositions also possess an attractive balance of mechanical properties.

BRIEF DESCRIPTION

The present inventors have discovered eco-friendly flame retardant alkenyl aromatic resin compositions which have flame retardant properties in combination with an attractive balance of mechanical properties. Articles made from the compositions of the present invention often exhibit V-1 flame rating or better as determined according to the UL-94 protocol. The articles are useful in applications requiring flame resistance, and particularly in applications requiring halogen-free (eco-friendly) compositions for flame resistance. This invention provides a unique solution for eco-friendly flame retardant polymer products using cost effective additives.

In one embodiment the present invention comprises a resinous, flame-retardant composition comprising (i) 40-66 wt. % alkenyl aromatic resin, (ii) 9-33 wt. % ammonium polyphosphate, (iii) 14-40 wt. % cellulosic material and (iv) an amount of between 0.1 parts per 100 parts resinous components (phr) and 10 phr of at least one metal stearate, wherein all weights are based on the total weight of the composition and wherein ammonium polyphosphate and cellulosic material are present in a weight % ratio effective to provide molded articles exhibiting at least V-1 flame rating as determined according to the UL-94 protocol.

In another embodiment the present invention comprises a resinous, flame-retardant composition comprising (i) 40-66 wt. % alkenyl aromatic resin, (ii) 9-33 wt. % ammonium polyphosphate, (iii) 14-40 wt. % cellulosic material, (iv) an amount of between 0.1 parts per 100 parts resinous components (phr) and 10 phr of at least one metal stearate, and (v) at least one additive selected from the group consisting of lubricants, flow promoters, plasticizers, antistatic agents, mold release agents, impact modifiers, stabilizers, color stabilizers, heat stabilizers, light stabilizers, antioxidants, anti-drip agents, UV screeners, UV absorbers, adjunct flame retardants, rubbery additives, adjunct copolymers comprising structural units derived from maleic anhydride, acrylic acid or methacrylic acid, and mixtures thereof, wherein ammonium polyphosphate and cellulosic material are present in a weight % ratio in a range of 1:2 to 2:1 effective to provide molded articles exhibiting at least V-1 flame rating as determined according to the UL-94 protocol.

In still another embodiment the present invention comprises an extrusion process for preparing a resinous, flame-retardant composition comprising (i) 40-66 wt. % alkenyl aromatic resin, (ii) 9-33 wt. % ammonium polyphosphate (iii) 14-40 wt. % cellulosic material, (iv) an amount of between 0.1 parts per 100 parts resinous components (phr) and 10 phr of at least one metal stearate, and (v) at least one additive selected from the group consisting of lubricants, flow promoters, plasticizers, antistatic agents, mold release agents, impact modifiers, stabilizers, color stabilizers, heat stabilizers, light stabilizers, antioxidants, anti-drip agents, UV screeners, UV absorbers, adjunct flame retardants, rubbery additives, adjunct copolymers comprising structural units derived from maleic anhydride, acrylic acid or methacrylic acid, and mixtures thereof, wherein ammonium polyphosphate and cellulosic material are present in a weight % ratio in a range of 1:2 to 2:1 effective to provide molded articles exhibiting at least V-1 flame rating as determined according to the UL-94 protocol, which process comprises the step of adding at least a portion of the ammonium polyphosphate to the extruder down-stream from the alkenyl aromatic resin and the cellulosic material.

Articles comprising a composition of the invention are also disclosed. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. The terminology "monoethylenically unsaturated" means having a single site of ethylenic unsaturation per molecule. The terminology "polyethylenically unsaturated" means having two or more sites of ethylenic unsaturation per molecule. The terminology "(meth)acrylate" refers collectively to acrylate and methacrylate; for example, the term "(meth)acrylate monomers" refers collectively to acrylate monomers and methacrylate monomers. The term "(meth)acrylamide" refers collectively to acrylamides and methacrylamides.

The term "alkyl" as used in the various embodiments of the present invention is intended to designate linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. Alkyl groups may be saturated or unsaturated, and may comprise, for example, alkenyl, vinyl or allyl. The term "alkyl" also encompasses that alkyl portion of alkoxide groups. In various embodiments normal and branched alkyl radicals are those containing from 1 to about 32 carbon atoms, and include as illustrative non-limiting examples $C_1$-$C_{32}$ alkyl (optionally substituted with one or more groups selected from $C_1$-$C_{32}$ alkyl, $C_3$-$C_{15}$ cycloalkyl or aryl); and $C_3$-$C_{15}$ cycloalkyl optionally substituted with one or more groups selected from $C_1$-$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. The term "aryl" as used in the various embodiments of the present invention is intended to designate substituted or unsubstituted aryl radicals containing from 6 to 20 ring carbon atoms. Some illustrative non-limiting examples of these aryl radicals include $C_6$-$C_{20}$ aryl optionally substituted with one or more groups selected from $C_1$-$C_{32}$ alkyl, $C_3$-$C_{15}$ cycloalkyl, aryl, and functional groups comprising atoms selected from Groups 15, 16 and 17 of the Periodic Table. Some particular illustrative examples of aryl radicals comprise substituted or unsubstituted phenyl, biphenyl, tolyl, naphthyl and binaphthyl.

Compositions in embodiments of the present invention comprise at least one alkenyl aromatic resin. There is no particular limitation on the alkenyl aromatic resin which in some embodiments may comprise one or more homopolymers, copolymers, core-shell resins or rubber-modified resins. In some particular embodiments alkenyl aromatic resins comprise at least one polymeric material with structural units derived from styrene. In other particular embodiments alkenyl aromatic resins are selected from the group consisting of polystyrene, expandable polystyrene, acrylonitrile-butadiene-styrene copolymer (ABS), rubber-modified polystyrene, high-impact polystyrene (HIPS), styrene-acrylonitrile copolymer (SAN), alkyl methacrylate-styrene-acrylonitrile copolymer, methyl methacrylate-styrene-acrylonitrile copolymer, styrene-butadiene copolymer, styrene-maleic anhydride copolymer, styrene-methyl acrylate copolymer, styrene-methyl methacrylate copolymer, alpha-methylstyrene/acrylonitrile copolymer, alpha-methylstyrene/styrene/acrylonitrile copolymer, polychlorostyrene, polyvinyltoluene, and the like and mixtures thereof.

In some embodiments compositions of the present invention comprise at least one rubber modified thermoplastic resin comprising a discontinuous elastomeric phase dispersed in a rigid thermoplastic phase, wherein at least a portion of the rigid thermoplastic phase is grafted to the elastomeric phase. The rubber modified thermoplastic resin employs at least one rubber substrate for grafting. The rubber substrate comprises the elastomeric phase of the composition. There is no particular limitation on the rubber substrate provided it is susceptible to grafting by at least a portion of a graftable monomer. In some embodiments suitable rubber substrates comprise butyl acrylate rubber, dimethyl siloxane/butyl acrylate rubber, or silicone/butyl acrylate composite rubber; polyolefin rubbers such as ethylene-propylene rubber or ethylene-propylene-diene (EPDM) rubber; diene-derived rubbers; or silicone rubber polymers such as polymethylsiloxane rubber. The rubber substrate typically has a glass transition temperature, Tg, in one embodiment less than or equal to 25° C., in another embodiment below about 0° C., in another embodiment below about minus 20° C., and in still another embodiment below about minus 30° C. As referred to herein, the Tg of a polymer is the T value of polymer as measured by differential scanning calorimetry (DSC; heating rate 20° C./minute, with the Tg value being determined at the inflection point).

In one embodiment the rubber substrate comprises a polymer having structural units derived from one or more unsaturated monomers selected from conjugated diene monomers and non-conjugated diene monomers. Suitable conjugated diene monomers include, but are not limited to, 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In a particular embodiment the conjugated diene monomer is 1,3-butadiene. Suitable non-conjugated diene monomers include, but are not limited to, ethylidene norbornene, dicyclopentadiene, hexadiene and phenyl norbornene.

In some embodiments the rubber substrate may optionally comprise structural units derived from minor amounts of other unsaturated monomers, for example up to about 30 percent by weight ("wt. %") of structural units derived from one or more monomers selected from ($C_2$-$C_8$)olefin monomers, alkenyl aromatic monomers and monoethylenically unsaturated nitrile monomers. As used herein, the term "($C_2$-$C_8$)olefin monomers" means a compound having from 2 to 8 carbon atoms per molecule and having a single site of ethylenic unsaturation per molecule. Suitable ($C_2$-$C_8$)olefin monomers include, e.g., ethylene, propene, 1-butene, 1-pentene, heptene. In other particular embodiments the rubber substrate may optionally include up to about 25 wt. % of structural units derived from one or more monomers selected from (meth)acrylate monomers, alkenyl aromatic monomers and monoethylenically unsaturated nitrile monomers. Suitable copolymerizable (meth)acrylate monomers include, but are not limited to, $C_1$-$C_{12}$ aryl or haloaryl substituted acrylate, $C_1$-$C_{12}$ aryl or haloaryl substituted methacrylate, or mixtures thereof, monoethylenically unsaturated carboxylic acids, such as, for example, acrylic acid, methacrylic acid and itaconic acid; glycidyl (meth)acrylate, hydroxy alkyl (meth)acrylate, hydroxy($C_1$-$C_{12}$)alkyl (meth)acrylate, such as, for example, hydroxyethyl methacrylate; ($C_4$-$C_{12}$)cycloalkyl (meth)acrylate monomers, such as, for example, cyclohexyl methacrylate; (meth)acrylamide monomers, such as, for example, acrylamide, methacrylamide and N-substituted-acrylamide or N-substituted-methacrylamides; maleimide monomers, such as, for example, maleimide, N-alkyl maleimides, N-aryl maleimides, N-phenyl maleimide, and haloaryl substituted maleimides; maleic anhydride; methyl vinyl ether, ethyl vinyl ether, and vinyl esters, such as, for example, vinyl acetate and vinyl propionate. Suitable alkenyl aromatic monomers include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, 4-isopropylstyrene, vinyl toluene, alpha-methyl vinyl toluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable. As used herein, the term "monoethylenically unsaturated nitrile monomer" means an acyclic compound that includes a single nitrile group and a single site of ethylenic unsaturation per molecule and includes, but is not limited to, acrylonitrile, methacrylonitrile, alpha-chloro acrylonitrile, and the like.

In a particular embodiment the elastomeric phase comprises from 60 to 100 wt. % repeating units derived from one or more conjugated diene monomers and from 0 to 40 wt. % repeating units derived from one or more monomers selected from alkenyl aromatic monomers and monoethylenically unsaturated nitrile monomers, such as, for example, a styrene-butadiene copolymer, an acrylonitrile-butadiene copolymer or a styrene-butadiene-acrylonitrile copolymer. In another particular embodiment the elastomeric phase comprises from 70 to 90 wt. % repeating units derived from one or more conjugated diene monomers and from 30 to 10 wt. % repeating units derived from one or more monomers selected from alkenyl aromatic monomers.

The rubber substrate may be present in the rubber modified thermoplastic resin in one embodiment at a level of from about 5 wt. % to about 80 wt. %, based on the weight of the rubber modified thermoplastic resin. In one particular embodiment the rubber substrate may be present in the rubber modified thermoplastic resin at a level of from about 10 wt. % to about 25 wt. %, based on the weight of the rubber modified thermoplastic resin. In another particular embodiment the rubber substrate may be present in the rubber modified thermoplastic resin at a level of from about 55 wt. % to about 80 wt. %, based on the weight of the rubber modified thermoplastic resin.

There is no particular limitation on the particle size distribution of the rubber substrate (sometimes referred to hereinafter as initial rubber substrate to distinguish it from the rubber substrate following grafting). In some embodiments the initial rubber substrate may possess a broad, essentially monomodal, particle size distribution with particles ranging in size from about 50 nanometers (nm) to about 1000 nm, and more particularly with particles ranging in size from about 200 nm to about 500 nm. In other embodiments the mean particle size of the initial rubber substrate may be less than about 100 nm. In still other embodiments the mean particle size of the initial rubber substrate may be in a range of between about 80 nm and about 400 nm. In other embodiments the mean particle size of the initial rubber substrate may be greater than about 400 nm. In still other embodiments the mean particle size of the initial rubber substrate may be in a range of between about 400 nm and about 750 nm. In still other embodiments the initial rubber substrate comprises particles which are a mixture of particle sizes with at least two mean particle size distributions. In a particular embodiment the initial rubber substrate comprises a mixture of particle sizes with each mean particle size distribution in a range of between about 80 nm and about 750 nm. In another particular embodiment the initial rubber substrate comprises a mixture of particle sizes, one with a mean particle size distribution in a range of between about 80 nm and about 400 nm; and one with a broad and essentially monomodal mean particle size distribution.

The rubber substrate may be made according to known methods, such as, but not limited to, a bulk, solution, or emulsion process. In one non-limiting embodiment the rubber substrate is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan, to form particles of rubber substrate.

The rigid thermoplastic resin phase of the rubber modified thermoplastic resin comprises one or more thermoplastic polymers. In one embodiment of the present invention monomers are polymerized in the presence of the rubber substrate to thereby form the rigid thermoplastic phase, at least a portion of which is chemically grafted to the elastomeric phase. The portion of the rigid thermoplastic phase chemically grafted to rubber substrate is sometimes referred to hereinafter as grafted copolymer. In some embodiments two or more different rubber substrates, each possessing a different mean particle size, may be separately employed in a polymerization reaction to prepare the rigid thermoplastic phase, and then the products blended together to make the rubber modified thermoplastic resin. In illustrative embodiments wherein such products each possessing a different mean particle size of initial rubber substrate are blended together, then the ratios of said substrates may be in a range of about 90:10 to about 10:90, or in a range of about 80:20 to about 20:80, or in a range of about 70:30 to about 30:70. In some embodiments an initial rubber substrate with smaller particle size is the major component in such a blend containing more than one particle size of initial rubber substrate.

The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C. In a particular embodiment the rigid thermoplastic phase comprises a polymer having structural units derived from one or more monomers selected from the group consisting of alkenyl aromatic monomers and monoethylenically unsaturated nitrile monomers. Suitable alkenyl aromatic monomers and monoethylenically unsaturated nitrile monomers include those set forth hereinabove in the description of the rubber substrate. In addition, the rigid thermoplastic resin phase may, provided that the Tg limitation for the phase is satisfied, optionally include up to about 10 wt. % of third repeating units derived from one or more other copolymerizable monomers.

The rigid thermoplastic phase typically comprises one or more alkenyl aromatic polymers. Suitable alkenyl aromatic polymers comprise at least about 20 wt. % structural units derived from one or more alkenyl aromatic monomers. In one embodiment the rigid thermoplastic phase comprises an alkenyl aromatic polymer having structural units derived from one or more alkenyl aromatic monomers and from one or more monoethylenically unsaturated nitrile monomers. Examples of such alkenyl aromatic polymers include, but are not limited to, styrene/acrylonitrile copolymers, alpha-methylstyrene/acrylonitrile copolymers, or alpha-methylstyrene/styrene/acrylonitrile copolymers. These copolymers may be used for the rigid thermoplastic phase either individually or as mixtures.

When structural units in copolymers are derived from one or more monoethylenically unsaturated nitrile monomers, then the amount of nitrile monomer added to form the copolymer comprising the grafted copolymer and the rigid thermoplastic phase may be in one embodiment in a range of between about 5 wt. % and about 40 wt. %, in another embodiment in a range of between about 5 wt. % and about 30 wt. %, in another embodiment in a range of between about 10 wt. % and about 30 wt. %, and in yet another embodiment in a range of between about 15 wt. % and about 30 wt. %, based on the total weight of monomers added to form the copolymer comprising the grafted copolymer and the rigid thermoplastic phase.

The rigid thermoplastic resin phase of the rubber modified thermoplastic resin may, provided that the Tg limitation for the phase is satisfied, optionally include up to about 10 wt. % of repeating units derived from one or more other copolymerizable monomers such as, e.g., monoethylenically unsaturated carboxylic acids such as, e.g., acrylic acid, methacrylic acid, and itaconic acid; hydroxy($C_1$-$C_{12}$)alkyl (meth)acrylate monomers such as, e.g., hydroxyethyl methacrylate; ($C_4$-$C_{12}$) cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "$(C_4-C_{12})$cycloalkyl" means a cyclic alkyl substituent group having from 4 to 12 carbon atoms per group.

The amount of grafting that takes place between the rubber substrate and monomers comprising the rigid thermoplastic phase varies with the relative amount and composition of the rubber substrate. In one embodiment, greater than about 10 wt. % of the rigid thermoplastic phase is chemically grafted to the rubber substrate, based on the total amount of rigid thermoplastic phase in the composition. In another embodiment, greater than about 15 wt. % of the rigid thermoplastic phase is chemically grafted to the rubber substrate, based on the total amount of rigid thermoplastic phase in the composition. In still another embodiment, greater than about 20 wt. % of the rigid thermoplastic phase is chemically grafted to the rubber substrate, based on the total amount of rigid thermoplastic phase in the composition. In particular embodiments the amount of rigid thermoplastic phase chemically grafted to the rubber substrate may be in a range of between about 5 wt. % and about 90 wt. %; between about 10 wt. % and about 90 wt. %; between about 15 wt. % and about 85 wt. %; between about 15 wt. % and about 50 wt. %; or between about 20 wt. % and about 50 wt. %, based on the total amount of rigid thermoplastic phase in the composition. In yet other embodiments, about 40 wt. % to 90 wt. % of the rigid thermoplastic phase is free, that is, non-grafted.

The rigid thermoplastic phase polymer may be made according to known processes, for example, mass polymerization, emulsion polymerization, suspension polymerization or combinations thereof, wherein at least a portion of the rigid thermoplastic phase is chemically bonded, i.e., "grafted" to the rubber substrate via reaction with unsaturated sites present in the rubber substrate in the case of the rigid thermoplastic phase. The grafting reaction may be performed in a batch, continuous or semi-continuous process.

In particular embodiments compositions of the invention comprise a rubber modified thermoplastic resin which is an ABS resin. Illustrative ABS resins suitable for use in compositions of the present invention comprise those available from SABIC Innovative Plastics™ under the tradename CYCLOLAC®. In some particular embodiments compositions of the invention comprise 5-50 wt. % rubber derived from at least one alkenyl aromatic resin such as ABS, the wt. % value being based on the weight of the entire composition, wherein the term "rubber" refers to the rubber substrate in ABS. In still other particular embodiments compositions of the invention comprise 5-35 wt. % rubber derived from at least one alkenyl aromatic resin such as ABS and based on the weight of the entire composition. In still other particular embodiments compositions of the invention comprise 5-30 wt. % rubber derived from at least one alkenyl aromatic resin such as ABS and based on the weight of the entire composition. In yet other particular embodiments compositions of the invention comprise less than 30 wt. % rubber derived from at least one alkenyl aromatic resin such as ABS and based on the weight of the entire composition. The rubber content may be varied by employing a single alkenyl aromatic resin with desired rubber content or by employing two or more alkenyl aromatic resins each with different rubber content. In some embodiments compositions of the invention comprise 40-70 wt. % alkenyl aromatic resin and in other embodiments 40-66 wt. % alkenyl aromatic resin based on the total weight of the composition. In some other embodiments compositions of the invention comprise 5-50 wt. % rubber derived from rubber-comprising resins and based on the weight of the entire composition. In still other embodiments compositions of the invention comprise 5-35 wt. % rubber derived from rubber-comprising resins and based on the weight of the entire composition.

Compositions in embodiments of the invention comprise at least one additive comprising cellulose, which additive is sometimes referred to herein after as cellulosic material. In various embodiments the cellulosic material comprises or is derived from cellulosic fiber, wood fiber, flax fiber, hemp fiber, jute fiber, seed husks, ground rice hulls, newspaper, kenaf, coconut shell, or like materials. In some specific embodiments the cellulosic material may be wood fiber, which is available in different forms. In other illustrative examples cellulosic material comprises or is derived from sawdust, alfalfa, wheat pulp, wood chips, wood particles, ground wood, wood flour, wood flakes, wood veneers, wood laminates, paper, cardboard, straw, cotton, peanut shells, bagasse, plant fibers, bamboo fiber, palm fiber, or like materials. Those skilled in the art should recognize that the cellulosic material of the present invention may be any suitable combination of different types of cellulosic material. In some particular embodiments the cellulosic material is selected from cellulosic fibers and wood flour. In other particular embodiments compositions of the invention comprise a cellulosic material and, optionally, a component comprising starch, often a starch or a flour, referred to herein after as "starch". Illustrative examples of starch comprise cornstarch, wheat starch, wheat flour, potato starch, potato flour, corn flour, gluten-free baking flour, atta flour, rye flour, rice flour, buckwheat flour, chestnut flour, garbanzo bean flour, teff flour, barley flour, nut flour, tapioca flour, soy flour, tang flour, spelt flour, pea flour, bean flour, chuno flour, acorn flour, taro flour, amaranth flour, arrowroot flour, quinoa flour and the like and mixtures thereof. In particular embodiments starch comprises cornstarch. When present in compositions of the invention, starch is present in a wt./wt. ratio to cellulosic material in a range of between 1:99 and 99:1 in some embodiments, in a wt./wt. ratio to cellulosic material in a range of between 1:10 and 10:1 in other embodiments and in a wt./wt. ratio to cellulosic material in a range of between 1:2 and 2:1 in still other embodiments. In some specific embodiments the compositions of the invention do not contain cornstarch.

Compositions in embodiments of the invention also comprise at least one ammonium polyphosphate. Ammonium polyphosphates are known materials and may be prepared, for example, as exemplified in U.S. Pat. Nos. 3,423,343 and 3,513,114. In some illustrative embodiments the ammonium polyphosphates have the general formula $(NH_4)_n H_2 P_n O_{3n+1}$, wherein n is 1 or more, or $(NH_4 PO_3)_n$ wherein n represents an integer equal to or greater than 2. Illustrative examples of commercially available ammonium polyphosphates comprise EXOLIT® ammonium polyphosphate produced and sold by Clariant, PHOS-CHECK® ammonium polyphosphate available from ICL Performance Products LP and FR CROS® ammonium polyphosphate available from Budenheim Jberica Comercial S.A. In one embodiment compositions of the invention comprise at least one "crystal phase II" ammonium polyphosphate which may be cross-linked and/or branched. Crystal phase II ammonium polyphosphates are known in the art. They are high molecular weight ammonium polyphosphates, and exhibit high thermal stability (for example, decomposition starting at about 300° C.) and low water solubility. An illustrative example of a crystal phase II ammonium polyphosphate is EXOLIT® AP 423 available from Clariant. Coated ammonium polyphosphate may also be employed in compositions of the invention in some embodiments. Illustrative examples of coated ammonium polyphosphates comprise melamine-coated or melamine-formaldehyde-coated or surface-reacted melamine-coated ammonium polyphosphate. One illustrative coated ammonium polyphosphate is FR CROS® C40 available from Budenheim Iberica Comercial S.A.

In various embodiments of the invention ammonium polyphosphate and cellulosic material may be present together in compositions of the invention in total amount by weight effective to provide articles exhibiting at least V-1 flame rating or better as determined according to the UL-94 protocol. In particular embodiments ammonium polyphosphate may be present in compositions of the invention in an amount in a range of between about 5 wt. % and about 35 wt. %, or in an amount in a range of between about 7 wt. % and about 33 wt. %, or in an amount in a range of between about 9 wt. % and about 33 wt. %, or in an amount in a range of between about 12 wt. % and about 33 wt. %, based on the weight of the entire composition. In particular embodiments cellulosic material may be present in compositions of the invention in an amount in a range of between about 5 wt. % and about 45 wt. %, or in an amount in a range of between about 10 wt. % and about 40 wt. %, or in an amount in a range of between about 14 wt. % and about 40 wt. %, based on the weight of the entire composition. In other particular embodiments of the invention ammonium polyphosphate and cellulosic material may be present in a weight % ratio effective to provide articles exhibiting V-0 or V-1 or V-2 flame rating as determined according to the UL-94 protocol. In other particular embodiments of the invention ammonium polyphosphate and cellulosic material may be present in a weight % ratio in a range of 1:10 to 10:1, often 1:8 to 8:1, more often 1:5 to 5:1, still more often 1:3 to 3:1 and still more often 1:2 to 2:1. In other particular embodiments when starch is present in the compositions, then the combination of cellulosic material and starch may be present in compositions of the invention in an amount in a range of between about 5 wt. % and about 45 wt. %, or in an amount in a range of between about 10 wt. % and about 40 wt. %, or in an amount in a range of between about 14 wt. % and about 40 wt. %, based on the weight of the entire composition. In other particular embodiments of the invention (i) ammonium polyphosphate and (ii) the combination of cellulosic material and optional starch may be present in a weight % ratio effective to provide articles exhibiting V-0 or V-1 or V-2 flame rating as determined according to the UL-94 protocol. In other particular embodiments of the invention (i) ammonium polyphosphate and (ii) the combination of cellulosic material and optional starch may be present in a weight % ratio of (i) to (ii) in a range of 1:10 to 10:1, often 1:8 to 8:1, more often 1:5 to 5:1, still more often 1:3 to 3:1 and still more often 1:2 to 2:1.

Compositions of the present invention may also optionally comprise additives known in the art including, but not limited to, stabilizers, such as color stabilizers, heat stabilizers, light stabilizers, antioxidants, UV screeners, and UV absorbers; adjunct flame retardants, anti-drip agents, lubricants, flow promoters or other processing aids; plasticizers, antistatic agents, mold release agents, impact modifiers, fillers, or colorants such as dyes or pigments which may be organic, inorganic or organometallic; visual effects additives and like additives. Illustrative additives include, but are not limited to, silica, silicates, zeolites, titanium dioxide, stone powder, glass fibers or spheres, carbon fibers, carbon black, graphite, calcium carbonate, talc, lithopone, zinc oxide, metal stearate, zinc stearate, magnesium stearate, aluminum stearate, zirconium silicate, iron oxides, diatomaceous earth, calcium carbonate, magnesium oxide, chromic oxide, zirconium oxide, aluminum oxide, crushed quartz, clay, calcined clay, talc, kaolin, asbestos, cellulose, wood flour, cork, cotton or synthetic textile fibers, especially reinforcing fillers such as glass fibers, carbon fibers, metal fibers, and metal flakes, including, but not limited to aluminum flakes. Often more than one additive is included in compositions of the invention, and in some embodiments more than one additive of one type is included. In particular embodiments compositions of the invention comprise at least one metal stearate. In other particular embodiments compositions of the invention comprise zinc stearate. The amount of metal stearate present in compositions of the invention is an amount sufficient to improve the color of parts molded from said compositions compared to similar parts molded from compositions prepared without metal stearate. In some particular embodiments the amount of metal stearate is in a range of between 0.1 parts per 100 parts resinous components (phr) and 10 phr, in other particular embodiments in a range of between 0.5 phr and 5 phr, and in still other particular embodiments in a range of between 0.7 phr and 3 phr.

In some particular embodiments compositions of the invention optionally comprise a rubbery additive. Illustrative rubbery additives comprise an elastomeric homopolymer or copolymer. Particular illustrative examples of such rubbery additives include but are not limited to polydienes such as polyisoprene and polybutadiene; styrene-diene block copolymers including diblock and triblock copolymers, in which the diene structural units may be partially or entirely hydrogenated; olefin polymers containing carboxylic acid or ester groups; nitrile-butadiene rubber, natural butyl rubber, polyisobutylene, and core-shell polymers having rubbery cores and stiff shells with carboxylic acid groups or functional derivatives thereof (e.g., anhydride, ester, amide or imide groups).

Other particular examples of such rubbery additives include, but are not limited to, styrenic block copolymers and various acid functionalized ethylene-propylene copolymers (e.g., EP-graft-maleic anhydride). Further examples are the so-called elastomeric block copolymers, for example, A-B-A triblock copolymers and A-B diblock copolymers. The A-B and A-B-A type block copolymer impact modifiers which may be used are typically thermoplastic rubbers comprised of one or two alkenyl aromatic blocks, which are typically styrene blocks, and a rubber block, e.g., a butadiene block which may be partially or totally hydrogenated. Mixtures of these triblock copolymers and diblock copolymers are often suitable for use in the present compositions. Suitable A-B and A-B-A type block copolymers are disclosed in, for example, U.S. Pat. Nos. 3,078,254, 3,402,159, 3,297,793, 3,265,765, and 3,594,452 and U.K. Patent 1,264,741. Examples of typical species of A-B and A-B-A block copolymers include polystyrene-polybutadiene (SBR), hydrogenated polystyrene-polybutadiene (also sometimes known as polystyrene-poly(ethylene-propylene)), polystyrene-polyisoprene, poly(alpha-methylstyrene)-polybutadiene, polystyrene-polybutadiene-polystyrene (SBS), hydrogenated polystyrene-polybutadiene-polystyrene (also sometimes known as polystyrene-poly(ethylene-butylene)-polystyrene (SEBS)), polystyrene-polyisoprene-polystyrene and poly(alpha-methylstyrene)-polybutadiene-poly(alpha-methylstyrene), as well as the selectively hydrogenated versions thereof. Illustrative A-B and A-B-A block copolymers are available commercially from a number of sources, including INSA, Houston, Tex., under the trademark SOLPRENE, Kraton Polymers LLC under the trademark KRATON, Dexco under the tradename VECTOR, and Kuraray under the trademark SEPTON.

In further embodiments useful rubbery additives may comprise functionalized elastomeric polyolefins such as elastomeric polyolefins containing at least one moiety of the group consisting of anhydride, epoxy, oxazoline, and orthoester. The essential structural units of the elastomeric polyolefin are typically derived from monomers comprising ethylene and at least one $C_{3-8}$-alpha-olefin, such as propylene, 1-butene, 1-hexene, and 1-octene. The proportions of ethylene and at least one $C_{3-8}$-alpha-olefin are not critical provided that they together constitute the major portion of the polymer.

In one particular embodiment, the functionalized elastomeric polyolefin is a functionalized ethylene-propylene rubber or a functionalized ethylene-propylene-diene elastomer. The diene portion is at least one non-conjugated diene, such as ethylidene norbornene, 1,4-hexadiene, or dicyclopentadiene. These elastomeric polyolefins are known in the art as EPR and EPDM elastomers, respectively. Mixtures of rubbery additives, such as mixtures of those previously described are also useful in compositions of the present invention. In some particular embodiments illustrative examples of rubbery additives comprise those known in the art to improve the impact strength of compositions comprising an alkenyl aromatic resin. In other particular embodiments compositions of the invention comprise nitrile-butadiene rubber or styrene-butadiene rubber.

In some particular embodiments compositions of the invention optionally comprise at least one organophosphorus compound as an adjunct flame retardant. Suitable organophosphorus flame retardant compounds are known in the art and include, but are not limited to, monophosphate esters such as triaryl phosphates, triphenyl phosphate, tricresyl phosphate, tritolyl phosphate, diphenylcresyl phosphate, phenyl bisdodecyl phosphate, and ethyl diphenyl phosphate, as well as diphosphate esters and oligomeric phosphates such as, for example, aryl diphosphates, resorcinol diphosphate, bisphenol A diphosphate, diphenyl hydrogen phosphate, and 2-ethylhexyl hydrogen phosphate. Suitable oligomeric phosphate compounds are set forth for example in U.S. Pat. No. 5,672,645. An adjunct flame retardant, when present, is typically present in an amount of about 4-16 wt. % and particularly 5-15 wt. % based on the weight of the entire composition.

In other particular embodiments compositions of the invention optionally comprise at least one adjunct copolymer comprising structural units derived from maleic anhydride, acrylic acid or methacrylic acid. Illustrative examples of adjunct copolymers of this generic type comprise styrene-maleic anhydride copolymer (SMA), styrene-acrylonitrile-maleic anhydride copolymer (SANMA), poly(ethylene-g-maleic anhydride), poly(propylene-g-maleic anhydride), (ethylene-propylene)-g-maleic anhydride, EPDM-g-maleic anhydride, styrene-acrylic acid copolymer (SAA) and the like and mixtures thereof. An adjunct copolymer comprising structural units derived from maleic anhydride, acrylic acid or methacrylic acid, when present in a composition of the invention, is present in some embodiments in an amount sufficient to improve the impact strength of formed parts derived from said composition in comparison to the impact strength of formed parts derived from a composition not containing said copolymer. In particular embodiments an adjunct copolymer comprising structural units derived from maleic anhydride, acrylic acid or methacrylic acid, when present in a composition of the invention, is typically present in an amount of about 0.2-5 phr and particularly 0.5-3 phr.

Compositions of the invention and articles made therefrom may be prepared by known thermoplastic processing techniques. Known thermoplastic processing techniques which may be used include, but are not limited to, batch mixing, mixing in an internal mixer, mixing in an Banbury mixer, extrusion, extrusion in a single-screw extruder, extrusion in a twin-screw extruder, calendering, kneading, profile extrusion, sheet extrusion, pipe extrusion, coextrusion, molding, extrusion blow molding, thermoforming, injection molding, co-injection molding, rotomolding, compression molding, and like processes and combinations of such processes. In a particular embodiment compositions are prepared by an extrusion process. In a particular embodiment articles are prepared from compositions of the invention by an injection molding process. The invention further contemplates additional fabrication operations on said articles, such as, but not limited to, in-mold decoration, baking in a paint oven, welding, machining, over-molding, co-extrusion, multilayer extrusion, surface etching, lamination, and/or thermoforming.

Novel aspects of the invention encompass processes for making compositions of the invention wherein in some embodiments ammonium polyphosphate and cellulosic material are included in the compositions in such a manner so as to minimize the contact time between ammonium polyphosphate and cellulosic material. Illustrative examples for minimizing said contact time include but are not limited to precompounding all or at least a portion of resinous components and the cellulosic material before inclusion of ammonium polyphosphate. In other embodiments of the invention all or at least a portion of alkenyl aromatic resin may be precompounded with all or at least a portion of ammonium polyphosphate before combination with cellulosic material. In other particular embodiments all or at least a portion of alkenyl aromatic resin may be precompounded with all or at least a portion of ammonium polyphosphate and that precompounded material may then be combined with a separate precompounded material comprising alkenyl aromatic resin and cellulosic material. Additional resinous and non-resinous compositional components may optionally be included in any precompounded mixture. In some embodiments a precompounded mixture may comprise all the blend compositional components except ammonium polyphosphate or all the blend compositional components except cellulosic material. Such precompounding of alkenyl aromatic resin with either (i) ammonium polyphosphate or (ii) cellulosic material may be performed using known methods, such as but not limited to extrusion or kneading. Compounding of a mixture of precompounded materials comprising (i) alkenyl aromatic resin and ammonium polyphosphate and (ii) alkenyl aromatic resin and cellulosic material may be performed using known compounding processes. Precompounded material comprising alkenyl aromatic resin and ammonium polyphosphate contains in one embodiment 15-80 wt. % ammonium polyphosphate, in another embodiment 15-60 wt. % ammonium polyphosphate, and in still another embodiment 20-55 wt. % ammonium polyphosphate, based on the total weight of the precompounded material. Precompounded material comprising alkenyl aromatic resin and cellulosic material contains in one embodiment 15-60 wt. % cellulosic material, in another embodiment 20-50 wt. % cellulosic material, and in still another embodiment 25-45 wt. % cellulosic material, based on the total weight of the precompounded material.

In other embodiments compositions of the invention are prepared in an extrusion process, and all or at least a portion of ammonium polyphosphate is fed to the extruder at a down-stream feed-port of the extruder wherein all or at least a portion of alkenyl aromatic resin and cellulosic material have been fed at the extruder feed-throat. In still other embodiments, compositions of the invention are prepared in an extrusion process, and all or at least a portion of the cellulosic material is fed to the extruder at a down-stream feed-port of the extruder wherein all or at least a portion of alkenyl aromatic resin and ammonium polyphosphate have been fed at the extruder feed-throat. Any compounding process for compositions of the invention, including but not limited to downstream feeding of ammonium polyphosphate during extrusion, may be performed by feeding solid ammonium polyphosphate or by injecting a liquid mixture of ammonium polyphosphate optionally in combination with one or more additional blend components, for example, at least one adjunct flame retardant such as a liquid adjunct flame retardant. Optionally, any extrusion process may include vacuum venting at one or more appropriate points in the extruder. A particular embodiment of the invention is an extrusion process for preparing a resinous, flame-retardant composition comprising (i) 40-66 wt. % alkenyl aromatic resin, (ii) 9-33 wt. % ammonium polyphosphate and (iii) 14-40 wt. % cellulosic material, wherein ammonium polyphosphate and cellulosic material are present in a weight % ratio in a range of 1:2 to 2:1 effective to provide molded articles exhibiting at least V-1 flame rating as determined according to the UL-94 protocol, and wherein the composition comprises 15-30 wt. % rubber, the rubber content being based on the weight of the entire composition, which process comprises the step of adding all or a portion of the ammonium polyphosphate to the extruder down-stream from the alkenyl aromatic resin and the cellulosic material.

The compositions of the present invention can be formed into useful articles. Useful articles comprise those which are commonly used in applications requiring flame resistance and particularly in applications requiring halogen-free (eco-friendly) compositions for flame resistance. In some embodiments the articles comprise unitary articles comprising a composition of the invention. In other embodiments articles comprise electrical housings, business machine internal and external parts, printers, computer housings, switches, profiles, window profiles and like articles. Multilayer articles comprising at least one layer derived from a composition of the invention are also contemplated. Articles, for example molded articles, made from the compositions of the present invention often exhibit V-1 flame rating or better (for example, V-1 or V-0 rating) as determined according to the UL-94 protocol.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples (abbreviated "Ex.") and comparative examples ("C.Ex.") the amounts of components are expressed in wt. % unless noted. ABS in the following compositions comprised about 14-17% polybutadiene rubber and was obtained from SABIC Innovative Plastics™. High rubber ABS (abbreviated "HR-ABS") was BLENDEX® ABS comprising about 60-78% polybutadiene rubber and was obtained from SABIC Innovative Plastics™. High impact polystyrene (HIPS comprised less than about 10% rubber content. Styrene-acrylonitrile copolymer (SAN) comprised structural units derived from about 3:1 styrene:acrylonitrile. Ammonium polyphosphate (abbreviated "APP") was EXOLIT® AP 423 ammonium polyphosphate containing about 31-32 weight % phosphorus and was obtained from Clariant. Cellulose fiber was grade TC180 obtained from CreaFill Fibers Corp., Chestertown, Md. Wood flour was obtained from American Wood Flour Company, Schoefield, Wis. Flame retardant properties were determined according to the UL-94 protocol. The notation "NC" for flame retardant rating indicates no flame retardancy was observed. Notched Izod impact strength (NII) values in units of joules per meter were determined according to ISO 180 at room temperature. Flexural strength values in units of megapascals and flexural modulus values in units of gigapascals were determined according to ISO 178.

COMPARATIVE EXAMPLES 1-8 AND EXAMPLES 1-6

Compositions comprising ABS in Table 1 were compounded in an extruder unless otherwise described. The compounded material was molded into test parts and the parts were tested for physical properties. The test results are shown in Table 1.

TABLE 1

| Component | C. Ex. 1[a] | C. Ex. 2[a] | C. Ex. 3[a] | C. Ex. 4 | C. Ex. 5 | C. Ex. 6 | C. Ex. 7 | Ex. 1[b] | Ex. 2[b] | Ex. 3[b] | Ex. 4[b] | Ex. 5[d] | Ex. 6[b] | C. Ex. 8[c] |
|---|---|---|---|---|---|---|---|---|---|---|---|---|---|---|
| ABS | 80 | 70 | 60 | 80 | 70 | 60 | 70 | 50 | 55 | 50 | 55 | 63 | 57.7 | 57.5 |
| Cellulose fiber | 20 | 30 | 40 | — | — | — | — | 30 | 25 | 20 | 15 | 20 | 30 | 30 |
| Wood flour | — | — | — | 20 | 30 | 40 | — | — | — | — | — | — | — | — |
| APP | — | — | — | — | — | — | 30 | 20 | 20 | 30 | 30 | 17 | 12.5 | 12.5 |
| FR rating | NC | NC | NC | NC | NC | NC | NC | V-0 | V-1 | V-0 | V-1 | V-1 | V-0 | NC |
| Strength, MPa | — | — | — | — | — | — | — | — | — | — | — | 62.6 | 58.2 | 58.2 |
| Modulus, GPa | — | — | — | — | — | — | — | — | — | — | — | 3.40 | 3.08 | 3.06 |

[a]Prepared in an internal mixer
[b]APP fed downstream of other blend components
[c]APP fed in extruder feed-throat with other blend components
[d]ABS and cellulose precompounded before blending with APP Comparative examples 1-3 show that cellulose fiber alone does not impart flame retardant properties to ABS. Comparative examples 4-6 show that wood flour alone does not impart flame retardant properties to ABS. Comparative example 7 shows that a high level (30 wt. %) of ammonium polyphosphate alone does not impart flame retardant properties to ABS. Surprisingly, examples 1-5 show that the combination of cellulosic material and ammonium polyphosphate imparts good flame resistance to ABS compositions either when ammonium polyphosphate is fed down-stream of the feed throat while ABS and cellulosic material are fed directly to the feed-throat of the extruder (example 1-4 and 6) or when ABS and cellulose are precompounded before blending with APP (example 5). Comparative example 8 shows that the combination of cellulose fiber and ammonium polyphosphate does not impart good flame resistance to ABS compositions when all three components are fed directly to the feed-throat of the extruder. Although the invention is in no way limited by any theory of operation, it is believed that feeding ammonium polyphosphate in the feed-throat along with cellulosic material leads to detrimental reaction between these two components. For example, it is believed that ammonium polyphosphate can promote cross-linking of at least some cellulosic material leading to poor dispersion of such material in a resinous matrix.

COMPARATIVE EXAMPLES 9-21 AND EXAMPLES 7-8

Compositions comprising ABS in Table 2 were prepared with a total rubber concentration of about 15 wt. %. The rubber level was achieved by combining two ABS grades with different rubber contents. The compositions were compounded in an extruder with downstream feeding of APP. The compounded material was molded into test parts and the parts were tested for physical properties. The test results are shown in Table 2. Example 7 and example 8 had similar amounts and ratio of ammonium polyphosphate and cellulosic material, but in addition example 8 had 10 wt. % adjunct flame retardant triphenyl phosphate. The data show that the addition of an adjunct flame retardant provided good flame resistance. The addition of adjunct flame retardant also provided molded parts with better color, better flow properties and allowed the use of lower processing temperature for the composition.

COMPARATIVE EXAMPLES 22-23 AND EXAMPLES 9-12

Compositions comprising ABS in Table 3 were compounded in an internal mixer. The compounded material was molded into test parts and the parts were tested for flame resistance. The test results are shown in Table 3.

TABLE 3

| | Ex. or C. Ex. | | | | | |
|---|---|---|---|---|---|---|
| Component | Ex. 9 | Ex. 10 | Ex. 11 | Ex. 12 | C. Ex. 22 | C. Ex. 23 |
| ABS | 65 | 60 | 60 | 57.5 | 65 | 60 |
| cellulose | 20 | 20 | 20 | 30 | 20 | 20 |
| APP | 15 | 20 | 10 | 12.5 | — | — |
| TPP | — | — | 10 | — | 15 | 20 |
| FR rating | V-1 | V-1 | V-1 | V-0 | NC | NC |

Compositions comprising alkenyl aromatic resin, cellulosic material and ammonium polyphosphate in examples 9-12 show good flame resistance. In contrast, the comparative examples 22-23 which contain ratios of styrenic polymer to cellulosic material similar to those ratios in examples of the invention but which also contain only organophosphorus flame retardant and no ammonium polyphosphate exhibit poor flame resistance.

COMPARATIVE EXAMPLES 24-26 AND EXAMPLES 13-18

Compositions comprising high impact polystyrene (HIPS) were compounded in an internal mixer. The compounded material was molded into test parts and the parts were tested for flame resistance. Blend compositions and test results are shown in Table 4.

TABLE 2

| | Ex. or C. Ex. | | | | | | | | | | | | | | |
|---|---|---|---|---|---|---|---|---|---|---|---|---|---|---|---|
| Component | C. Ex. 9 | C. Ex. 10 | C. Ex. 11 | C. Ex. 12 | C. Ex. 13 | C. Ex. 14 | C. Ex. 15 | C. Ex. 16 | C. Ex. 17 | C. Ex. 18 | C. Ex. 19 | C. Ex. 20 | C. Ex. 21 | Ex. 7 | Ex. 8 |
| ABS | 87.3 | 74.6 | 73.3 | 72.0 | 71.4 | 70.1 | 68.2 | 63.7 | 63.7 | 59.3 | 57.4 | 55.4 | 54.2 | 52.9 | 40.2 |
| HR-ABS | 2.7 | 5.4 | 5.7 | 6.0 | 6.1 | 6.4 | 6.8 | 8.0 | 7.8 | 8.7 | 9.1 | 9.6 | 9.8 | 10.1 | 12.8 |
| cellulose | 5 | 5 | 5 | 5 | 12.5 | 12.5 | 20 | 12.5 | 12.5 | 5 | 12.5 | 20 | 20 | 20 | 20 |
| APP | 5 | 5 | 11 | 17 | 5 | 11 | 5 | 11 | 11 | 17 | 11 | 5 | 11 | 17 | 17 |
| TPP | — | 10 | 5 | — | 5 | — | — | 5 | 5 | 10 | 10 | 10 | 5 | — | 10 |
| FR rating | NC | NC | NC | NC | NC | NC | NC | NC | NC | NC | NC | NC | NC | NC | V-0 |
| Strength, MPa | 61.6 | 50.2 | 53.7 | 52.4 | 60.0 | 59.3 | 62.0 | 57.4 | 55.9 | 41.4 | 47.9 | 51.4 | 55.6 | 51.9 | 45.4 |
| Modulus, GPa | 2.30 | 2.31 | 2.23 | 2.21 | 2.68 | 2.62 | 2.74 | 2.65 | 2.63 | 2.29 | 2.77 | 2.99 | 2.98 | 2.87 | 3.29 |
| NII, J/m$^{-1}$ | 43 | 32 | 27 | 32 | 27 | 32 | 32 | 27 | 27 | 21 | 21 | 21 | 21 | 21 | 27 |

TABLE 4

| Component | C. Ex. 24 | C. Ex. 25 | C. Ex. 26 | Ex. 13 | Ex. 14 | Ex. 15 | Ex. 16 | Ex. 17 | Ex. 18 |
|---|---|---|---|---|---|---|---|---|---|
| HIPS | 70.5 | 66.5 | 68 | 65 | 65.5 | 63 | 58 | 63 | 58 |
| cellulose | 12.5 | 12.5 | 15 | 15 | 12.5 | 15 | 15 | 20 | 20 |
| APP | 17 | 11 | 17 | 15 | 17 | 17 | 17 | 17 | 17 |
| TPP | — | 10 | — | 5 | 5 | 5 | 10 | — | 5 |
| FR rating | NC | NC | NC | NC | V-1 | V-1 | V-0 | V-0 | V-0 |

COMPARATIVE EXAMPLES 27-30 AND EXAMPLES 19-26

Compositions comprising polystyrene (PS) were compounded in an internal mixer. The compounded material was molded into test parts and the parts were tested for flame resistance. Blend compositions and test results are shown in Table 5.

TABLE 5

| Component | C. Ex. 27 | C. Ex. 28 | C. Ex. 29 | C. Ex. 30 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|
| PS | 70.5 | 65.5 | 66.5 | 68 | 63 | 65 | 58 | 63 | 58 | 60 | 58 | 56 |
| cellulose | 12.5 | 12.5 | 12.5 | 15 | 15 | 15 | 15 | 20 | 20 | 25 | 25 | 25 |
| APP | 17 | 17 | 11 | 17 | 17 | 15 | 17 | 17 | 17 | 15 | 17 | 19 |
| TPP | — | 5 | 10 | — | 5 | 5 | 10 | — | 5 | — | — | — |
| FR rating | NC | NC | NC | NC | NC | NC | V-0 | V-1 | V-0 | V-1 | V-0 | V-0 |

COMPARATIVE EXAMPLES 31-34 AND EXAMPLES 27-34

Compositions comprising SAN were compounded in an internal mixer. The compounded material was molded into test parts and the parts were tested for flame resistance. Blend compositions and test results are shown in Table 6.

TABLE 6

| Component | C. Ex. 31 | C. Ex. 32 | C. Ex. 33 | C. Ex. 34 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|
| SAN | 70.5 | 65.5 | 66.5 | 68 | 63 | 65 | 58 | 63 | 58 | 60 | 58 | 56 |
| cellulose | 12.5 | 12.5 | 12.5 | 15 | 15 | 15 | 15 | 20 | 20 | 25 | 25 | 25 |
| APP | 17 | 17 | 11 | 17 | 17 | 15 | 17 | 17 | 17 | 15 | 17 | 19 |
| TPP | — | 5 | 10 | — | 5 | 5 | 10 | — | 5 | — | — | — |
| FR rating | NC | NC | NC | NC | NC | NC | V-0 | NC | V-0 | V-1 | V-1 | V-0 |

COMPARATIVE EXAMPLES 35-40 AND EXAMPLES 28-29

Compositions of the invention comprising HR-ABS, cellulosic material and zinc stearate were compounded in an internal mixer. Compositions for comparative examples were compounded without zinc stearate. Test parts of the compounded material were evaluated for color. Color was measured using a Macbeth ColorEye® 7000A spectrophotometer with evaluation test conditions: DREOLL; D65 Illuminate; CIE LAB Equations; 10 degree Observer; reflectance mode; Specular Component Excluded (SCE); UV Excluded; Large view Port. Blend compositions and test results are shown in Table 7.

TABLE 7

|  | Ex. or C. Ex. | | | | | | | |
| --- | --- | --- | --- | --- | --- | --- | --- | --- |
|  | C. Ex. 35 | C. Ex. 36 | C. Ex. 37 | Ex. 28 | C. Ex. 38 | C. Ex. 39 | C. Ex. 40 | Ex. 29 |
| Component |  |  |  |  |  |  |  |  |
| HR-ABS | 25 | 25 | 25 | 25 | 25 | 25 | 25 | 25 |
| SAN | 33 | 33 | 33 | 33 | 33 | 33 | 33 | 33 |
| cellulose | 25 | 25 | 25 | 25 | 25 | 25 | 25 | 25 |
| APP | 17 | 17 | 17 | 17 | 17 | 17 | 17 | 17 |
| EBS wax | — | 1 phr | 3 phr | 2 phr | — | 1 phr | 3 phr | 2 phr |
| Zn stearate | — | — | — | 1 phr | — | — | — | 1 phr |
| Process | mixer | mixer | mixer | mixer | mold | mold | mold | mold |
| Property |  |  |  |  |  |  |  |  |
| L* | 46.8 | 55.5 | 69.9 | 82.9 | 46.3 | 49.2 | 47.3 | 67.0 |
| a* | 4.3 | 5.1 | 3.2 | 0.4 | 2.4 | 2.2 | 3.7 | 4.0 |
| b* | 12.2 | 16.4 | 15.0 | 14.1 | 5.2 | 5.8 | 7.6 | 14.5 |

The data in Table 7 show that compositions in examples of the invention comprising zinc stearate have better color than compositions in comparative examples not containing zinc stearate.

EXAMPLE 30

A composition comprising at least one alkenyl aromatic resin and cellulosic material is precompounded and isolated. A separate composition comprising at least one alkenyl aromatic resin and ammonium polyphosphate is precompounded and isolated. Proportions of the two precompounded compositions are compounded together and the product isolated. The final compounded material is molded into test parts and the parts are tested for flame resistance. The molded test parts show at least V-2 UL-94 flame rating.

COMPARATIVE EXAMPLE 41 AND EXAMPLE 31

A composition comprising HR-ABS and cellulose fibers was precompounded and isolated. A separate composition comprising HR-ABS and ammonium polyphosphate was precompounded and isolated. Proportions of the two precompounded compositions were compounded together to provide a final composition comprising 20 wt. % cellulose fibers, 25 wt. % HR-ABS and 17 wt. % ammonium polyphosphate. In addition the final composition comprised 35 wt. % SAN, and minor amounts of EBS wax and SANMA. The final compounded material was isolated and molded into test parts, and the parts were tested for CIE LAB color. The parts showed L*value of 58.8, a*value of 4.4 and b*value of 12.3. Test parts of a comparative example prepared by compounding all the components together in a mixer without precompounding of any pairs of components was darker in color and showed L*value of 42.1, a*value of 1.8 and b*value of 3.4.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A resinous, flame-retardant composition comprising (i) 40-66 wt. % alkenyl aromatic resin, (ii) 9-33 wt. % ammonium polyphosphate, (iii) 14-40 wt. % cellulosic material, (iv) an amount of between 0.1 parts per 100 parts resinous components (phr) and 10 phr of at least one metal stearate, (v) at least one adjunct flame retardant selected from the group consisting of monophosphate esters, triaryl phosphates, triphenyl phosphate, tricresyl phosphate, tritolyl phosphate, diphenylcresyl phosphate, phenyl bisdodecyl phosphate, ethyl diphenyl phosphate, diphosphate esters, aryl diphosphates, resorcinol diphosphate, bisphenol A diphosphate, diphenyl hydrogen phosphate, 2-ethylhexyl hydrogen phosphate and oligomeric phosphates, and (vi) an adjunct copolymer selected from the group consisting of styrene-maleic anhydride copolymer (SMA), styrene-acrylonitrile-maleic anhydride copolymer (SANMA), poly(ethylene-g-maleic anhydride), poly(propylene-g-maleic anhydride), (ethylene-propylene)-g-maleic anhydride, EPDM-g-maleic anhydride, styrene-acrylic acid copolymer (SAA) and mixtures thereof, wherein all weights are based on the total weight of the composition and wherein ammonium polyphosphate and cellulosic material are present in a weight % ratio effective to provide molded articles exhibiting at least V-1 flame rating as determined according to the UL-94 protocol.

2. The composition of claim 1, wherein ammonium polyphosphate and cellulosic material are present in a weight % ratio in a range of 1:3 to 3:1.

3. The composition of claim 1, wherein ammonium polyphosphate and cellulosic material are present in a weight % ratio in a range of 1:2 to 2:1.

4. The composition of claim 1, wherein the alkenyl aromatic resin is selected from the group consisting of polystyrene, acrylonitrile-butadiene-styrene copolymer (ABS), high-impact polystyrene (HIPS), styrene-acrylonitrile copolymer (SAN), alpha-methylstyrene/acrylonitrile copolymer, alpha-methylstyrene/styrene/acrylonitrile copolymer and mixtures thereof.

5. The composition of claim 1, wherein the type of ammonium polyphosphate is crystal phase II.

6. The composition of claim 1, wherein the cellulosic material comprises or is derived from cellulosic fiber, wood fiber, seed husks, ground rice hulls, newspaper, kenaf, coconut shell, sawdust, alfalfa, wheat pulp, wood chips, wood particles, ground wood, wood flour, wood flakes, wood veneers, wood laminates, paper, cardboard, straw, cotton, peanut shells, bagass, plant fibers, bamboo fiber, or palm fiber.

7. The composition of claim 1, wherein the metal stearate is zinc stearate.

8. The composition of claim 1, further comprising at least one additive selected from the group consisting of lubricants, flow promoters, plasticizers, antistatic agents, mold release agents, impact modifiers, stabilizers, color stabilizers, heat stabilizers, light stabilizers, antioxidants, anti-drip agents, UV screeners, UV absorbers, a rubbery additive, and mixtures thereof.

9. The composition of claim 8, comprising at least one rubbery additive selected from the group consisting of styrene-diene block copolymers, styrene-butadiene rubber and nitrile-butadiene rubber.

10. The composition of claim 8, wherein the adjunct copolymer is present in an amount of about 0.2-5 phr.

11. The composition of claim 1, which is prepared by an extrusion process wherein at least a portion of the ammonium polyphosphate is fed down-stream from the alkenyl aromatic resin and cellulosic material.

12. The composition of claim 1, which is prepared by an extrusion process wherein at least a portion of the alkenyl aromatic resin and cellulosic material are precompounded together before combination with ammonium polyphosphate.

13. The composition of claim 1, which is prepared by a compounding process wherein at least a portion of the alkenyl aromatic resin and starch are precompounded, at least a portion of the alkenyl aromatic resin and ammonium polyphosphate are precompounded, and proportions of the two precompounded materials are compounded to form a final composition.

14. An article comprising the composition of claim 1.

15. An article comprising the composition of claim 8.

16. An article comprising the composition of claim 9.

17. The article of claim 14, which comprises an electrical housing, a business machine internal or external part, a printer housing, a computer housing, a switch, a profile or a window profile.

18. A resinous, flame-retardant composition comprising (i) 40-66 wt. % alkenyl aromatic resin, (ii) 9-33 wt. % ammonium polyphosphate, (iii) 14-40 wt. % cellulosic material, (iv) an amount of between 0.1 parts per 100 parts resinous components (phr) and 10 phr of at least one metal stearate, (v) at least one additive selected from the group consisting of lubricants, flow promoters, plasticizers, antistatic agents, mold release agents, impact modifiers, stabilizers, color stabilizers, heat stabilizers, light stabilizers, antioxidants, anti-drip agents, UV screeners, UV absorbers, rubbery additives, and mixtures thereof, vi) an adjunct copolymer selected from the group consisting of styrene-maleic anhydride copolymer (SMA), styrene-acrylonitrile-maleic anhydride copolymer (SANMA), poly(ethylene-g-maleic anhydride), poly(propylene-g-maleic anhydride), (ethylene-propylene)-g-maleic anhydride, EPDM-g-maleic anhydride, styrene-acrylic acid copolymer (SAA) and mixtures thereof, and (vii) at least one adjunct flame retardant selected from the group consisting of monophosphate esters, triaryl phosphates, triphenyl phosphate, tricresyl phosphate, tritolyl phosphate, diphenylcresyl phosphate, phenyl bisdodecyl phosphate, ethyl diphenyl phosphate, diphosphate esters, aryl diphosphates, resorcinol diphosphate, bisphenol A diphosphate, diphenyl hydrogen phosphate, 2-ethylhexyl hydrogen phosphate and oligomeric phosphates, wherein ammonium polyphosphate and cellulosic material are present in a weight % ratio in a range of 1:2 to 2:1 effective to provide molded articles exhibiting at least V-1 flame rating as determined according to the UL-94 protocol.

19. The composition of claim 18, wherein the metal stearate is zinc stearate.

20. The composition of claim 18, comprising at least one rubbery additive selected from the group consisting of styrene-diene block copolymers, styrene-butadiene rubber and nitrile-butadiene rubber.

21. The composition of claim 18, wherein the adjunct copolymer is present in an amount of about 0.2-5 phr.

22. An article comprising the composition of claim 18.

23. An extrusion process for preparing a resinous, flame-retardant composition comprising (i) 40-66 wt. % alkenyl aromatic resin, (ii) 9-33 wt. % ammonium polyphosphate, (iii) 14-40 wt. % cellulosic material, (iv) an amount of between 0.1 parts per 100 parts resinous components (phr) and 10 phr of at least one metal stearate, (v) at least one additive selected from the group consisting of lubricants, flow promoters, plasticizers, antistatic agents, mold release agents, impact modifiers, stabilizers, color stabilizers, heat stabilizers, light stabilizers, antioxidants, anti-drip agents, UV screeners, UV absorbers, rubbery additives, and mixtures thereof, vi) an adjunct copolymer selected from the group consisting of styrene-maleic anhydride copolymer (SMA), styrene-acrylonitrile-maleic anhydride copolymer (SANMA), poly(ethylene-g-maleic anhydride), poly(propylene-g-maleic anhydride), (ethylene-propylene)-g-maleic anhydride, EPDM-g-maleic anhydride, styrene-acrylic acid copolymer (SAA) and mixtures thereof, and (vii) at least one adjunct flame retardant selected from the group consisting of monophosphate esters, triaryl phosphates, triphenyl phosphate, tricresyl phosphate, tritolyl phosphate, diphenylcresyl phosphate, phenyl bisdodecyl phosphate, ethyl diphenyl phosphate, diphosphate esters, aryl diphosphates, resorcinol diphosphate, bisphenol A diphosphate, diphenyl hydrogen phosphate, 2-ethylhexyl hydrogen phosphate and oligomeric phosphates, wherein ammonium polyphosphate and cellulosic material are present in a weight % ratio in a range of 1:2 to 2:1 effective to provide molded articles exhibiting at least V-1 flame rating as determined according to the UL-94 protocol, which process comprises the step of adding at least a portion of the ammonium polyphosphate to the extruder downstream from the alkenyl aromatic resin and the cellulosic material.

24. The extrusion process of claim 23, wherein the composition comprises zinc stearate.

25. The extrusion process of claim 23, wherein the composition comprises at least one rubbery additive selected from the group consisting of styrene-diene block copolymers, styrene-butadiene rubber and nitrile-butadiene rubber.

26. The extrusion process of claim 23, wherein the adjunct copolymer is present in an amount of about 0.2-5 phr.

27. An article comprising the composition prepared by the process of claim 23.

* * * * *